May 24, 1955     R. G. REYNOLDSON     2,708,979
AUTOMATIC SPEED CONTROL MECHANISM FOR MOTOR VEHICLES
Filed Oct. 16, 1950     2 Sheets-Sheet 1
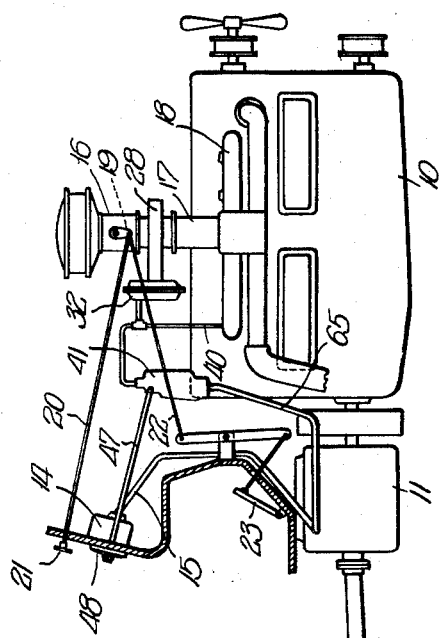
INVENTOR.
Roland G. Reynoldson,
BY
Cromwell, Greist & Warden
attys.

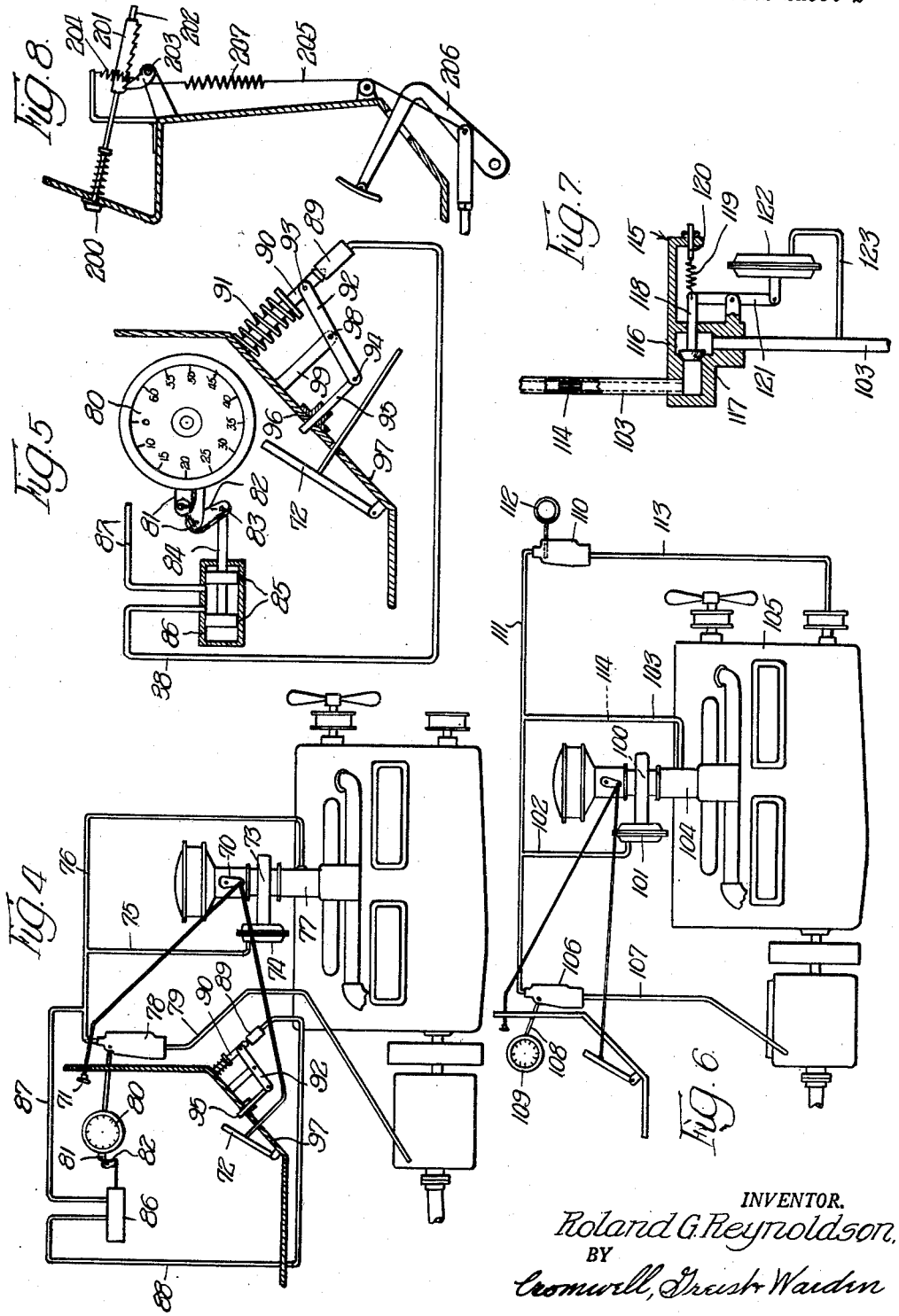

United States Patent Office 2,708,979
Patented May 24, 1955

2,708,979

AUTOMATIC SPEED CONTROL MECHANISM FOR MOTOR VEHICLES

Roland G. Reynoldson, Madison, Wis.

Application October 16, 1950, Serial No. 190,370

5 Claims. (Cl. 180—82.1)

This invention relates to mechanism for controlling the speed of an internal combustion engine of a self-propelled vehicle to prevent overspeeding of the vehicle.

It is a general object of the invention to provide means for controlling the speed of an internal combustion engine which includes a speed control mechanism operated independently of the speedometer and including an adjustable control for the same which may be set so that the control mechanism will automatically take over control of the engine when the speed of the vehicle reaches a predetermined amount.

It is a more specific object of the invention to provide an automatic control system for self-propelled vehicles having an engine provided with a fuel passage and a fuel controlling valve therein which control system comprises an auxiliary valve in the fuel passage and mechanism for operating the auxiliary valve which includes a vacuum or pressure actuated operating means connected to the valve, a vacuum or pressure line having a bleeder port therein, and a device for opening and closing the bleeder port which is responsive to the speed of the vehicle and which includes a manually settable element adapted to be positioned so that the bleeder port will be closed and the auxiliary fuel valve will be operated when the speed of the vehicle reaches a predetermined amount.

It is another object of the invention to provide an auxiliary control valve for the gas intake of an internal combustion engine in a motor vehicle and vacuum or pressure operated means for actuating the auxiliary control valve which includes a vacuum or pressure line, a pressure controlled actuator for moving the auxiliary valve connected to the line, a governor device responsive to the speed of the vehicle for opening and closing a bleeder port in the line and a manually settable device for adjusting the bleeder port and governor whereby when the vehicle reaches a predetermined speed the auxiliary control valve is automatically actuated to prevent overspeeding of the vehicle.

It is another object to provide an automatic speed control system of the type described wherein means is provided for release of the auxiliary control device to permit the operator of the vehicle to temporarily increase the speed of the vehicle beyond the maximum speed for which the auxiliary control device is set.

It is a further object of the invention to provide an automatic speed control system of the type described having emergency release for the auxiliary control and a locking device for the system which may be set to prevent operation of the emergency release.

It is a still further object of the invention to provide an automatic speed control system of the type described wherein a regulator is employed to maintain a constant vacuum or pressure in the line for operation of the auxiliary fuel valve.

It is another object of the invention to provide in an automatic speed control system for a self-propelled vehicle having an internal combustion engine, independent controls for automatically limiting the speed of the engine and the speed of the vehicle to prevent overspeeding of either the engine or the vehicle.

These and other objects and advantages will be apparent from a description of the preferred form of the invention which is shown by way of illustration in the accompanying drawings, wherein:

Fig. 1 is a schematic view of an automatic speed control mechanism embodying the principles of the invention applied to a motor vehicle;

Fig. 2 is a view, partially in section and partially schematic, of the bleeder port and a controller device for opening and closing the same;

Fig. 3 is a perspective view, partially in section and partially schematic, of the auxiliary fuel control valve and its operating mechanism;

Fig. 4 is a schematic view of an automatic speed control mechanism which includes a mechanical release;

Fig. 5 is a view of a portion of the mechanism of Fig. 4, to an enlarged scale;

Fig. 6 is a schematic view of a speed control mechanism which includes both a vehicle speed control and an engine speed control;

Fig. 7 is a view, partially in section and to an enlarged scale, of a vacuum line regulating mechanism which may be incorporated in the speed control mechanism; and Fig. 8 is a throttle release mechanism for use with the speed control mechanism.

Referring to Figs. 1 to 3 of the drawings, there is illustrated a speed control or governing mechanism, which embodies the principal features of the invention, applied to a motor vehicle having a conventional internal combustion engine 10, a transmission 11, a drive shaft 12 and a rear wheel 13. A speedometer head 14 is connected by a cable 15 to the end of the drive shaft 12, the transmission 11 or to any other suitable means such as the rear wheel, to indicate the running speed of the vehicle. The engine 10 is provided with the usual carburetor 16 having a passage 17 leading to the intake manifold 18. The passage 17 is provided with a butterfly control valve 19 which is connected by link 20 with a hand throttle 21 and by connecting members 22 with the foot pedal or accelerator 23 in a conventional manner.

The passage 17 is also provided with an auxiliary control valve 24 (Fig. 3) positioned between the conventional butterfly valve 19 and the intake manifold 18. The butterfly valve 24 is supported on an operating rod 25 which extends laterally from the valve 24 and is provided at its outer end with an arm 26 which is pivotally connected with one end of a rod 27 mounted for reciprocation in a casing 28. The rod 27 is secured at the other end 30 to a diaphragm 31 arranged in a two part casing 32 from which the casing 28 extends in a direction normal to the diaphragm 31. The arm 26 is also pivotally connected to the end of a rod 29 which carries at its outer end a spring 33, secured thereon by a washer 34 and retaining nuts 35. An abutment formation 36 is provided adjacent the end of the casing 28 against which the inner end of the spring 33 engages. A cap 37 encloses the end of the casing 28. The diaphragm 31 divides the casing 32 into two compartments 38 and 39 and movement of the rod 27 is controlled, of course, by differential pressure on opposite sides of the diaphragm 31. A change of pressure in either side 38 or 39 of the casing 32 results in the movement of the rod 27 and consequent closing movement of the auxiliary valve 24. The spring 33 operates through the rod 29 to hold the valve 24 normally open. The one side 38 of the casing 32 is connected to a vacuum line 40 which extends from the manifold 18 to the vacuum control device 41 (Figs. 1 and 2).

The vacuum control device 41 comprises a casing in the upper end of which there is provided a relatively small elongate recess or chamber 42 in which a bleeder port member 43 is slidably mounted, the member 43 having a relatively small bore corresponding to or smaller than the bore of vacuum line 40 and being in communication at one end with the vacuum line 40. The other end of the member 43 is in communication with the interior of the casing. The member 43 is provided with a rack formation 44 which engages with a pinion 45 rotatably mounted in a recess 46 in the casing.

A control wire or torsion rod 47 extends from the pinion 45 to a selector gauge 48 which may be supported on the vehicle where desired, preferably on the dashboard where it is readily accessible to the operator. The gauge 48 includes a rotatable disk 49 which is connected with the torsion rod 47 and which may be rotated to move the bleeder port member 43 into the desired adjusted position in the recess 42. The gauge 48 is provided with suitable indicia 50 to indicate miles per hour and also with a locking element 51 which permits the disk 49 to be locked in any desired position.

The controller 41 is also provided with a needle 52 which is adapted to close the bleeder port 43 when moved into the bore of the same. The needle 52 is mounted on a carrier block 53 which is movably supported on a fixed guide rod 54. The block 53 carries a rack formation 55 which engages with a rotatably mounted pinion 56. The pinion 56 engages an operating worm member 57 which is slidably mounted on a vertical shaft 58 which shaft 58 is supported in the bearings 59 and 60. The shaft 58 is provided at the lower end with a sleeve member 61 which is secured thereon for rotation therewith and which carries a pair of cross links 62 pivotally connected thereto intermediate their ends. The links 62 are pivotally connected at one end with a pair of shorter links 63 which are connected at the other end to the member 57. At the bottom or outer free ends the links 62 are provided with suitable weights 64 so that rotation of the shaft 58 tends to move the weights 64 outwardly by centrifugal force and, through the links 62, 63, to move the member 57 vertically on the shaft 58. As the speed of the shaft 58 increases, the member 57 moves downwardly and through the pinion 56 and rack 55 moves the needle 52 upwardly into engagement in the bore of the bleeder port 43. The shaft 58 is connected by a line 65 with the speedometer cable or with the drive shaft or one of the members in the transmission 11 which rotates upon movement of the vehicle, thus rotating the shaft 58 in accordance with the speed of movement of the vehicle. An atmospheric vent 66 is provided in the casing 41.

With the apparatus described the dial 49 may be set on the control gauge 48 to position the bleeder port 43 so that upon the speed of the vehicle reaching the predetermined dial setting the needle 52 will be moved into the bore of the member 43 and the vacuum line 40 closed so that the pressure in the side 38 of the casing 32 will be reduced and the diaphragm 31 will move in response to the differential pressure to operate the auxiliary valve 24 and automatically take over control of the speed of the engine. Any further opening of the conventional fuel valve 19 either by operation of the hand throttle 21 or the foot throttle 23 will have no effect on the speed of the engine due to the control exercised by the auxiliary valve 24.

Referring now to Figs. 4 and 5, there is illustrated a speed control arrangement which includes mechanism operated by the foot throttle for overriding or releasing the auxiliary valve control mechanism when the operator of the car desires to accelerate the speed temporarily, as when passing another vehicle on the road. In this arrangement the conventional fuel valve 70 is connected by the usual rods or link members with the hand throttle 71 or the foot throttle 72. The auxiliary fuel valve 73 is controlled by the diaphragm operated mechanism 74 which is vacuum actuated through the vacuum line 75 connecting with the line 76 running from the fuel passage 77 to the controller mechanism 78. The mechanism 74 is the same as the mechanism shown in Fig. 3.

The controller mechanism 78 is connected by a cable 79 to the drive shaft or transmission and operates in response to the speed of the vehicle. The controller mechanism 78 is the same as that shown in Fig. 2 and includes a gauge having a settable dial 80 for positioning the bleeder port for operation at a predetermined speed. The control dial 80 is provided with a lock 81 which is connected to one end of a link 82 (Fig. 5) with the other end thereof pivotally connected at 83 to one end of a plunger rod 84. The rod 84 is provided at its other end with a pair of disk members 85 spaced axially thereof and slidable in a valve chamber 86. The valve chamber 86 is connected by one line 87 with the vacuum line 76 and by another line 88 with a bleeder port 89 mounted on the vehicle beneath the foot throttle 72. The rod 84 and movement of the disks 85 causes the bleeder port 89 to be thrown in or out of the vacuum line, making the same effective or ineffective to break the vacuum in the line, depending upon whether the dial is unlocked or locked by the locking member 81. This provides for manual control of the bleeder port 89 by the operator of the vehicle at his option provided, of course, he has manual control of the locking member 81. A pin 90 for closing the bleeder port 89 is mounted for sliding movement beneath the foot throttle 72 and normally urged in port closing position by a compression spring 91. A link or arm 92 is pivotally connected at one end 93 to the pin 90. At the other end 94 it is connected to a pin 95 which extends through an aperture 96 in the floor board 97 of the vehicle in position to be depressed or moved downwardly by predetermined movement of the foot throttle 72. The arm 92 is pivoted intermediate its ends at 98 on a depending bracket 99 so that depression of the rod 95 retracts the pin 90 and opens the bleeder port 89 whereby when the bleeder port 89 is connected in the vacuum line the vacuum will be relieved and the auxiliary control valve returned to its normal position with control of the speed of the engine returned to the conventional fuel valve 70. With the mechanism as shown in Fig. 5 the dial 80 is unlocked, the locking member 81 being provided with a key controlled lock mechanism which, when the key is inserted and turned in the proper direction, locks or unlocks the dial 80. In the position shown the two disks 85 in the valve chamber 86 connect the normally closed bleeder port 89 into the vacuum line so that when the bleeder port 89 is opened, by depressing the foot throttle 72 sufficiently to withdraw the pin 90, the port 89 bleeds the vacuum system and renders the feed control mechanism ineffective. When the dial 80 is locked by proper rotation of the key and removal of the same, the disks 85 are moved to the left in the chamber 86 (Fig. 5) and the connection of line 87 with the chamber 86 is closed. The bleeder port 89 is then rendered ineffective and the vacuum control remains operative at the speed set on the dial 80.

Referring to Figs. 6 and 7, there is illustrated a modified speed control arrangement wherein provision is made for automatically preventing overspeeding of the vehicle and also overspeeding of the engine. In the illustrated arrangement an auxiliary fuel control valve 100 is actuated by a vacuum device 101 which is connected by line 102 with a vacuum line 103, the latter having a connection at one end with the fuel passage 104 between the auxiliary valve 100 and the vehicle engine 105. The vacuum line 103 is connected at the other end with a controller 106. The controller 106 is operated by a cable 107 running to the drive shaft or other part of the vehicle which rotates upon movement of the vehicle. The controller 106 is connected by torsion rod 108 with a settable gauge 109 by means of which the controller is set to close the bleeder port upon the vehicle reaching a predetermined speed. The details of the mechanisms thus far described and of the conventional controls for the vehicle engine are the same as in the preferred form of Figs. 1 to 3. An additional controller 110 is connected to the vacuum line 103 by line 111. The controller 110 is constructed the same as the device shown in Fig. 2 and is provided with an adjusting gauge 112 for adjusting the position of the movable bleeder port member therein. The controller 110 is connected by an operating cable 113 with the drive shaft of the engine 105 so that the controller is responsive to the engine speed. With this arrangement the auxiliary valve 100 will automatically take over control of the fuel input of the engine 105 upon closing of the bleeder ports in either of the controllers 106 and 110, the former being responsive to the speed of the vehicle and the latter being responsive to the speed of the engine, the auxiliary valve being so constructed that the diaphragm 31 is fully responsive to closure of either of the bleeder ports.

The vacuum line 103 may be provided with a constriction at 114 providing a passage of the same cross section as the bore in the bleeder ports in the controllers 106 and 110 so that the operation of the vacuum line, as the bleeder port is opened or closed will be uniform and gradual.

The vacuum line 103 may also be provided with a vacuum or pressure equalizer 115 as indicated in Fig. 7. The casing 116 is inserted in the line 103 and includes a valve 117 which opens and closes the line. The valve 117 includes a body member mounted on a stem 118 which is urged in an outward or open position by a spring 119 which is connected at one end to the end of the stem 118 and at the other end to an adjustable anchor 120. The end of the stem 118 is pivotally connected to one end of a bar 121 which is pivotally connected at the other end to a bellows 122 and which is pivotally mounted on the casing 116 intermediate its ends. The bellows 122 is connected by line 123 with the vacuum line 103 below the casing 116. The regulator device 115 operates to maintain a constant vacuum on the low vacuum side of the controller valve if the high vacuum varies on the other side of the controller valve.

Referring to Fig. 8 there is illustrated a latch and a quick acting release mechanism for use in connection with a hand throttle 200, when the fuel valve is controlled by a hand throttle. The latch mechanism comprises a toothed rack 201 secured on the throttle rod 202 and a cooperating pivoted dog 203 which is mounted on the car body and urged into engagement with the rack 201 by the tension spring 204. The dog 203 is connected to one end of a line 205 which is connected at its other end to the brake pedal 206 so that depression of the brake pedal 206 tensions the line 205 and urges the dog 203 out of engagement with the rack 201. The line 205 may include a tension spring 207. With this arrangement the hand throttle 200 may be latched in position or released by operation of the foot pedal as desired. The release mechanism may, of course, be connected for operation by the clutch pedal. This arrangement may be employed on a car equipped with the speed controller wherein a standard dashboard throttle control is provided rather than the conventional foot throttle control. A car equipped with a dash throttle controller can be equipped with the speed controlled arranged to take over the speed of the car by having the dash throttle pulled wholly or part way out and the driver can come to an immediate stop without having to push the dash throttle in by merely stepping on the brake pedal which immediately releases the dash throttle thereby shutting off feed through the carburetor by closing of the regular carburetor valve which is connected to the dash throttle.

I claim:

1. A speed control mechanism for a vehicle having an internal combustion engine, comprising an auxiliary control valve for the gas intake, a pressure line having a bleeder port therein, a pressure controlled actuator for moving said auxiliary valve connected in said pressure line, a centrifugal governor device responsive to the speed of the vehicle, said governor device including a movable element for closing said bleeder port, a manually settable device for adjusting the position of the bleeder port relative to said movable element whereby said bleeder port is closed by said governor device at selected vehicle speeds, a manually operated locking mechanism for said manually settable device, a normally closed second bleeder port in said pressure line adapted when open to render said actuator ineffective and means connected with said locking mechanism and under the control of the vehicle operator when said settable device is unlocked for opening said second bleeder port.

2. In a speed control mechanism for motor vehicles which comprises an auxiliary fuel control valve arranged intermediate the normal throttle valve and intake manifold of the engine, a pressure transmitting line, pressure responsive means connected in said pressure line for operating said auxiliary fuel control valve and a centrifugal governor member, said governor member comprising a vented casing having means forming a bleeder port at one end connected to said pressure line, an adjustably mounted extensible element in said bleeder port, a control device remote from said casing and connected to said extensible element for adjusting the position of said extensible element to move the bleeder port to selected positions in said casing, a closure member movably mounted in said casing for cooperation with said extensible element to close said bleeder port, a rotatable shaft extending into said compartment, said shaft being connected to a member which is rotatable in proportion to the speed of the vehicle, means movable on said shaft in response to rotation of said shaft, means connecting said movable means on said shaft to said closure member to move said closure member into closing relation with said bleeder port extensible element, a key controlled manually operated locking means for said control device, a second bleeder port in said pressure line, means normally closing said second bleeder port, manually controlled means for opening said second bleeder port, said second bleeder port when open rendering the bleeder port in said casing ineffective, and means associated with said locking means and said second bleeder port which renders said second bleeder port ineffective when said locking means is operated to lock said control device.

3. A speed control mechanism for motor vehicles which comprises an auxiliary fuel control valve arranged intermediate the normal throttle valve and intake manifold of the engine, a pressure transmitting line, pressure responsive means connected in said pressure line for operating said auxiliary fuel control valve and a regulator member, said regulator member comprising a casing having adjustable means forming a bleeder port connected to said pressure line, a manually settable device for adjusting the position of said bleeder port forming means, a movably mounted closure member for said bleeder port, means in said casing responsive to the speed of the vehicle for moving said closure member relative to said bleeder port, a second bleeder port in said pressure line, said second bleeder port being normally closed, means operable by the operator to open said second bleeder port whereby to temporarily release said speed control mechanism, a locking means for said settable device, a control valve in said pressure line adapted when closed to render said second bleeder port ineffective in said pressure line, and means connecting said control valve and said locking means whereby when said settable device is locked said control valve is closed.

4. A speed control mechanism for motor vehicles which comprises an auxiliary fuel control valve arranged intermediate the normal throttle valve and intake manifold of the engine, a pressure transmitting line, pressure responsive means connected in said pressure line for operating said auxiliary fuel control valve and a regulator member, said regulator member comprising a casing having a manually adjustable means forming a bleeder port connected to said pressure line, a movably mounted closure member for said bleeder port, means responsive to the speed of the vehicle for moving said closure member relative to said bleeder port, a normally closed second bleeder port in said pressure line whereby to temporarily release said speed control mechanism, a control valve in said pressure line adapted when closed to render said second bleeder port ineffective in said pressure line, means to lock said bleeder port forming means in adjusted position and means interconnecting said control valve and said locking means whereby when said bleeder port forming means is locked in adjusted position said control valve is closed.

5. A speed control mechanism for a vehicle having an internal combustion engine said control mechanism comprising an auxiliary control valve for the gas intake, a pressure line, a pressure controlled actuator for moving said auxiliary valve connected in said pressure line, a governor device including a casing connected in said pressure line and having a bleeder port therein, a bleeder port closing element mounted in said casing for movement toward and from said bleeder port in response to the speed of the vehicle, said bleeder port including an element in said casing which is adjustable to vary the distance between said bleeder port and said bleeder port closing element, a manually settable control device positioned at a point remote from said governor device and connected to said movable bleeder port element for adjusting the same whereby said bleeder port is closed by said closing element when the vehicle reaches the speed determined by said manually settable control device, a second bleeder port in said pressure line between said casing and said actuator which second bleeder port is adapted when open to render the bleeder port in said casing ineffective, means under the control of the operator for opening and closing said second bleeder port, means in said pressure line between said second bleeder port and said actuator operable to render said second bleeder port ineffective and means connected with said normally settable control device and said last mentioned means to lock said control device and to operate said last mentioned means to render said second bleeder port ineffective.

References Cited in the file of this patent
UNITED STATES PATENTS

| | | |
|---|---|---|
| 1,843,960 | Sticelber | Feb. 9, 1932 |
| 2,157,472 | Bellis | May 9, 1939 |
| 2,224,600 | Howard | Dec. 10, 1940 |
| 2,283,478 | Warren | May 19, 1942 |
| 2,314,841 | Crafts et al. | Mar. 23, 1943 |
| 2,521,736 | Mallory | Sept. 12, 1950 |
| 2,619,103 | Davies et al. | Nov. 25, 1952 |